Sept. 11, 1956        F. B. WHITE        2,762,346
ROTARY INTERNAL COMBUSTION ENGINE
Filed Dec. 8, 1952        2 Sheets-Sheet 2
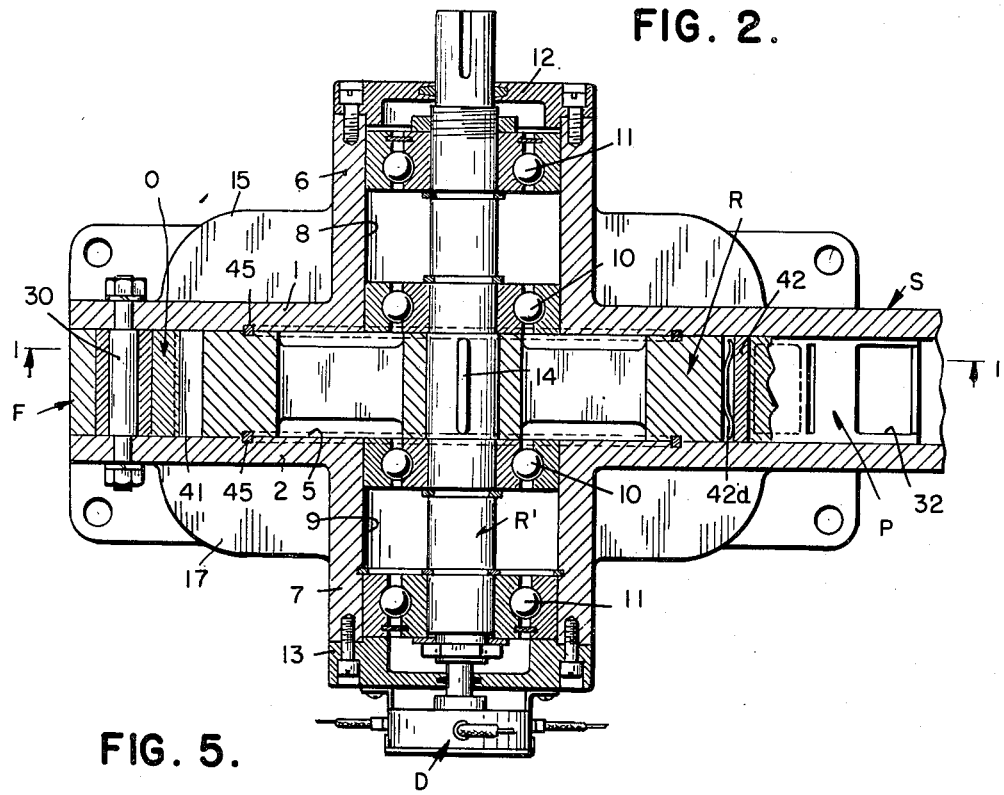
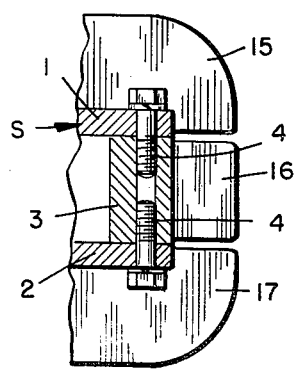
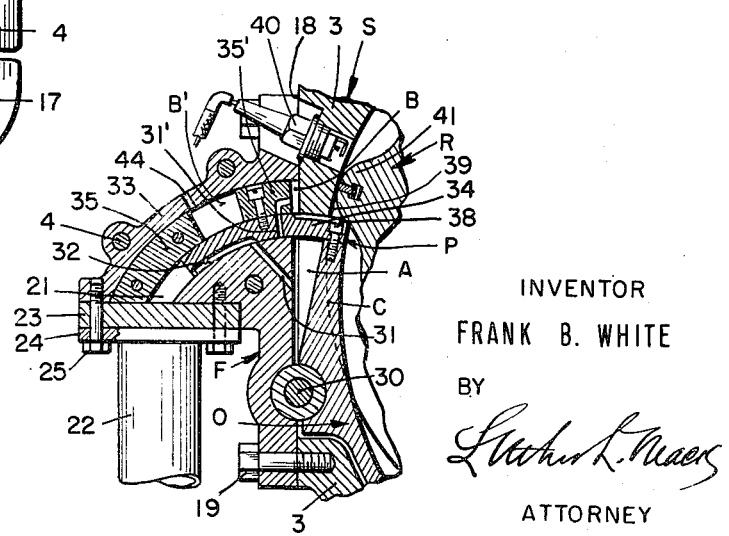
INVENTOR
FRANK B. WHITE
BY
ATTORNEY

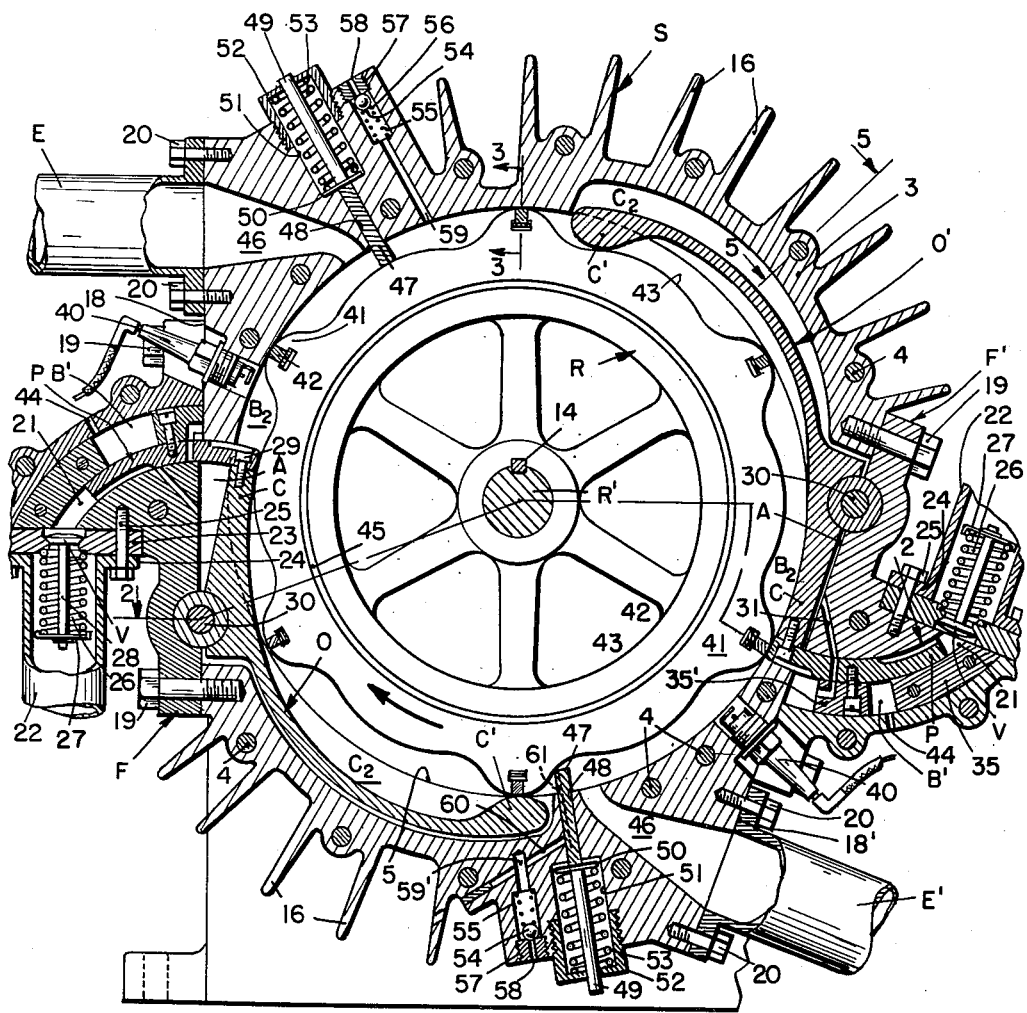

United States Patent Office 2,762,346
Patented Sept. 11, 1956

2,762,346
ROTARY INTERNAL COMBUSTION ENGINE

Frank B. White, Canoga Park, Calif., assignor of five per cent to Robert S. Butts, five per cent to Downey A. Grosenbaugh, both of Los Angeles, and ten per cent to John J. Woodruff, Pacific Palisades, Calif.

Application December 8, 1952, Serial No. 324,630

2 Claims. (Cl. 123—15)

This invention relates to and has for an object the provision of a rotary internal combustion motor embodying a stator having a circular cylinder and a rotor supported for unidirectional rotation therein. Said stator is characterized by the provision outwardly of said cylinder of preferably two or more compression chambers and associated pressurized fuel chambers under controlled communication with said cylinder; said rotor has two groups of uniformly spaced peripheral cam segments outwardly extended toward the cylinder wall and providing fluid receiving spaces therebetween; and an oscillatable compressor associated with each compression chamber under control of and actuated by said cam segments for compressing and admitting fuel from said pressurized chambers into successive chambers on or formed between adjacent cam segments of the same group to apply power to the rotor and exhaust the products of combustion at regularly timed intervals during each revolution of the rotor.

Another object is to provide means for automatically and cyclicly inducing a flow of gas from a source to the compression chambers under customary valve control, exhausting the products of combustion at the completion of each power impulse, igniting the gas after its injection into the combustion chambers, and utilization of other necessary accessories in a conventional manner or otherwise as may best adapt the principle of the invention to practical usage for providing a maximum output of power through the use of a minimum quantity of fuel and wasted effort.

A further object is to provide the oscillatable compressors, which are pivotally supported on the stator, with leading compressor arms and trailing cam followers for alternately extending and retracting the compressor arms to compress charges of gas in the compression chambers and induce new charges of gas into said chambers, respectively.

A still further object is to provide suitable fuel inlets to the combustion chambers, outlets therefrom to the pressurized holding chambers and from the holding chambers to successive combustion chambers of said cylinder.

Other objects include the provision of means for mounting the compressors, valves, spark plugs and other necessary elements on detachable fixtures secured to rather than integral with the stator so as to afford ready access to all parts of the motor for any purpose, and the inclusion in said separable fixtures of the fuel compression and holding chambers;

Scavengers yieldably borne by the stator for continuous traverse of the rotor to ensure complete evacuation of exhaust products following each power impulse;

Suitable seals at the crests of all cam segments of at least one group which correspond to piston rings in reciprocating motors and prevent loss of pressure between the cam crests and the cylinder wall.

Any other necessary adjuncts such as external fins on the stator to facilitate cooling of the engine driving operation, a suitable electrical ignition system, carburetter, etc.

In general, particularly as shown and described herein, this invention comprehends the provision of a rotary engine in which the number of power impulses applied to the rotor in each revolution is maximized and the intervals therebetween are minimized and are dependent upon the number of cam segments on the rotor and the number of compressors and associated compression chambers provided in a given type of motor.

It is well known that attempts to construct rotary internal combustion motors heretofore, have been discouraging and without much success because of the difficulties encountered of compression and retention of fuel under pressure to an extent which would afford a requisite output of power, and various and sundry expedients have been tested to no avail.

I have discovered that with a fixed and non-rotatable compression chamber, an associated pressure retaining chamber and a compressor actuated by the rotor at regular intervals, little if indeed any pressure is lost in the transfer of the compressed fuel to a holding chamber and thence in sequence to successive combustion chambers between the periphery of the rotor and the cylinder wall, especially when the compressor also serves as an abutment between which and one of the cam segments a combustion chamber is formed at each power cycle. The two groups of cam segments on the rotor serve to effect the extension and retraction of both the leading and trailing arms of the oscillatable compressors.

The aforesaid characteristics and operation of my improved motor will be readily understood by reference to the appended drawings which illustrate a preferred embodiment of the invention, subject to modification within the scope of the claims hereinafter set forth, without departing from the spirit of the invention.

In said drawing:

Fig. 1 is a sectional elevational view of the motor on line 1—1 of Fig. 2;

Fig. 2 is a section plan on line 2—2 of Fig. 1;

Figs. 3 and 4 are respectively fragmentary sectional views of the motor on line 3—3 of Fig. 1, and 4—4 of Fig. 3;

Fig. 5 is a fragmentary section on line 5—5 of Fig. 1; and

Fig. 6 is a fragmentary sectional view in the plane of Fig. 1 but showing a compressor fully retracted to admit fuel to a compression chamber.

Briefly described, the motor of my invention includes a stator generally represented and referred to as S, a rotor R mounted in the stator, a plurality of oscillators O and O' [only a pair being shown] each having a leading arm C serving as a compressor and a trailing arm C' serving as a cam follower, together with other features and appurtenances which will be described in detail herein.

Stator S as shown best in Fig. 2 is formed with side members 1 and 2 of disc-like form and an intermediate member 3 of arcuate or annular form, all of which are suitably secured together by a plurality of bolts 4, 4, etc., and arranged to provide a cylinder 5 of substantial diameter and of a depth or width corresponding to that of the space between members 1 and 2 and inwardly of member 3.

Members 1 and 2 have outwardly extended hubs 6 and 7, respectively, which are bored at 8 and 9 to receive inner and outer sets of frictionless bearings 10 and 11 in each case which serve to rotatably support rotor R on a drive shaft R'. Bores 8 and 9 have closures 12 and 13, respectively, which serve to hold the endmost bearings 11, 11 in place and also prevent leakage of a lubricant therefrom.

A distributor D which is suitably connected in the electric ignition circuit is affixed to closure 13 and shaft R' is keyed at 14 to rotor R. As shown in Fig. 5 the members 1, 2 and 3 of stator S are provided respectively with outwardly extended fins 15, 16 and 17.

For convenience of access to cylinder 5 and service operations the member 3 of the stator is formed with external flat surfaces 18 and 18' at substantially diametrically opposite locations so as to receive similar fixtures F and F', respectively, adapted to be secured to member 3 as by means of screws or bolts 19, 19, etc., in each case. Exhaust pipes E and E' are also secured to said flat surfaces by screws 20, 20.

Fixtures F and F' are similar and each has a fuel inlet 21 of arcuate form arranged to receive fuel from a tube 22 under control of an intake poppet valve V having a seat in a plate 23 which is held between a face of the fixture and a flange 24 of tube 22 as by screws 25. Valves V, V are held closed by springs 26, 26, adapted to compress between plates 23 and washers 27 on valve stems 28. Obviously, valves V are opened to admit gas from carburetter (not shown) through tubes 22 on each intake cycle of the motor.

The fuel inlet chambers 21, 21 slidably receive arcuate pistons P, P of flat rectangular cross section which are attached as by screws 29, 29 to oscillator arms C, C, whereby as the oscillators O and O' are swung on their axial pins 30, 30 the pistons will be extended into and retracted from the chambers 21, 21.

Compression chambers A, A are formed between C, C of the oscillators O and O' and adjacent walls of fixtures F and F' and are in controlled communication with inlet chambers 21, 21 through passages 31, 31 adapted to be opened and closed by pistons P, P.

As shown best in Fig. 6 when a piston P is sufficiently retracted the passage 31 will be open to chamber 21 due to an undercut or groove 32 on the concave side of the piston but when the piston is extended in a compression stroke the passage 31 will be closed. Between an outer arcuate wall 33 of each fixture and each piston a transfer chamber B is provided which is limited arcuately by a portion 34 of piston P and the surface 18 or 18' of member 3.

As a piston P is extended to the limit of a compression stroke after chamber A has been charged with fuel on a preceding intake stroke a passage 31' in the piston P will be moved into registration with passage 31 and will also then be open to transfer chamber B so that the compressed gas will be forced under pressure through the piston into chamber B and upon immediate retraction of the piston the gas in chamber B will be transferred through a cut or groove 38 into a segmental combustion chamber 39 between rotor R and the wall of cylinder 5, while the gas is still under compression for ignition, and combustion after but a slight forward movement of rotor R necessary to render a spark plug 40 effective. The retracted pistons P serve as abutments between which and the cam segments 41, 41, etc., the gas is compressed and fired for imparting successive power impulses to the rotor.

As shown in Fig. 1 the rotor R has six major cam segments 41, 41, etc., uniformly spaced apart thereon with sealing blades 42, mounted in the crest thereof (see Figs. 3 and 4) and an equal number of minor cam segments 43, 43, etc., alternating with the major segments and operative for timing and effecting the movement of the two pistons P, P in succession through actuation and control of the oscillators O and O'. In Fig. 6 one of the pistons P as at the left in Fig. 2, is receding from an outward stroke and has almost completed an intake of fuel to compression chamber A while the rightward piston P in Fig. 1 has almost completed a compression stroke and the transfer of the compressed charge from chamber A to chamber B. The leftward piston P in Fig. 6 is also in position to transfer the compressed charge of fuel from chamber B to a combustion chamber then beginning to form between one of the major cam segments 41 and the projecting piston P, the fuel flowing through piston groove 38. Each chamber B' between blocks 35 and 35' has an air vent 44 through wall 33 which prevents an air lock in said chamber which would interfere with the movement of pistons P. By reference to Figs. 1 and 6 it is apparent that when the compression chamber A is being charged from inlet 21 communication between chambers A and B and between chamber B and a combustion chamber must not be possible, nor is there at any time direct communication between the compression and combustion chambers. Each successive combustion chamber as at $B_2$ in Fig. 2 is defined by the contour of an adjacent cam segment 41, the side of a piston P and a peripheral surface of rotor R between the crests of cam segments 41 and 43 and is of minor area and extent at the movement of ignition of the compressed gas in order that each power impulse will be of maximum effect.

The pistons P, P are substantially in diametrical opposition and appropriately timed and arranged to become alternately operative so that one power impulse will follow another and become effective at or near the time the full effect of a preceding impulse has lost effect. As herein shown, the rotor R having six major cam segments and there being two pistons, at each revolution of rotor R there will be twelve power impulses per revolution and the application of power to the rotor is practically continuous with no resultant lost motion or dependence upon momentum for efficient operation.

The firing of successive charges of gas is through the medium of the spark plugs 40, 40 and is controlled by the distributor D, which elements are connected in a suitable electric ignition circuit of conventional or special character.

Rotor R is sealed against compression loss as by means of circular rings 45, 45 seated in grooves on abutting surfaces or rotor R and stator members 1 and 2 as shown in Fig. 2. The sealing blades 42, 42 (Figs. 1, 3 and 4) are held in recesses 42a and have narrow portions 42b extended through slots 42c while their wider bodies are urged outwardly by flat springs 42d to hold the outer edges of said blades in sealing engagement with the circular wall of stator S.

It will be understood that the points of combustion are fixed while the segments 41 on the rotor are relatively movable in a clockwise direction as shown in Figs. 1 and 6 and beyond each point of combustion, clockwise, there is provided an exhaust outlet 46 adapted for connection with an exhaust manifold E.

Also, immediately forwardly of each exhaust outlet I provide a yieldable scavenger blade 47 which is slidable in a slot 48 in the stator member 3 and has a stem 49 with a flange or collar 50 thereon movable in a bore 51 of member 3. Bore 51 is closed at the periphery of member 3 by a cap 52 which is threaded into bore 51. A spring 53 is compressed in bore 51 between cap 52 and collar 50 and serves to constantly urge the inner edge of blade 47 into engagement with the periphery of rotor R at points forwardly of exhaust outlet 46 so that as each combustion chamber is moved forwardly after a combustion cycle, the products of combustion will be completely evacuated from the cylinder.

Adjacent each exhaust outlet 46, I provide an air inlet valve 54 in a radial bore 55 of member 3 which is automatically openable by vacuum in the peripheral spaces between rotor R and member 3. Said valve 54 in each case is urged to closed position by a spring 56 which is held compressed by a plug 57 threaded into a counterbore at the outer end of bore 55 and having an air inlet 58 therein. In one case as at the left of Fig. 1 a passage 59 is provided in member 3 for admitting air from bore 55 to the rotor cylinder, while, as at the right in Fig. 1, in the other case a passage 59' is not directly open to the cylinder but is open indirectly to the cylinder by a bypass 60 and a grove 61 in the blade 47.

Necessarily, recesses $C_2$, $C_2$ are provided in member 3 outwardly of the path of the rotor segments 41 into which the arms C' of oscillators O and O' recede as said arms are moved by the segments 41.

In operation, it is apparent that as the pistons P are engaged and moved outwardly by cam segments 41 in succession, the follower arms C' are correspondingly moved inwardly into the valleys adjacent segments 41, and as the followers are swung outwardly by said segments 41 and by the minor segments 43 the pistons are correspondingly. The length of the arms C and C' of the oscillators O and O' and the peripheral spacing of the cam segments on the rotor are so proportioned that the pistons P, P operate synchronously at all times but on different cycles. For example, as shown in Fig. 1, the rightward piston has just completed a compression and full transfer cycle and is in readiness for partial retraction as oscillator arm C' traverses the minor cam segments 43 for opening communication between chamber B and an oncoming combustion chamber, following which said follower will be further moved by the next major cam segment so as to completely retract the piston and thereby close communication between chambers B and B2 as in the case of the leftward piston in Fig. 1 preceding a compression and transfer cycle.

In the meantime the leftward piston P was retracted by follower C' preparatory to a compression cycle, following which it will begin a compression cycle. Thus, as shown, one piston has completed a compression cycle in readiness for an ensuing power cycle, while the other piston is in readiness to begin a compression cycle preparatory to a second power cycle.

An important feature of my rotary internal combustion motor consists of the provision of positive means for both extending and retracting the compressors in lieu of springs often employed for retraction thereof. By means of the arrangement shown herein the pistons are extended in compression cycles by the major cam segments 41 and they are similarly retracted by the engagement of the followers C' with the segment 41.

The motor is, therefore, a two-cycle type inasmuch as the power and exhaust cycles are eliminated and those cycles are performed simultaneous with the operation of the rotor and without extra strokes of the pistons. A power impulse is applied immediately following completion of an intake cycle and exhaust of the products of combustion immediately follows completion of a power impulse.

I claim:

1. A rotary engine comprising: a stator, a rotor operatively supported in and enclosed by said stator, said rotor having a plurality of uniformly spaced peripheral cam segments the crests of which rotatively engage a wall of said stator, an oscillator supported in said stator outwardly of and in engagement with said rotor, said oscillator defining a fuel compression chamber with said stator, means defining a fuel inlet chamber in said stator, means for injecting fuel into said fuel inlet chamber, a piston attached to said oscillator slidably positioned within said stator so as to be capable of movement into and out of said fuel inlet chamber, passage means in said stator adapted to be opened and closed by motion of said piston connecting said fuel inlet chamber and said compression chamber, means defining a transfer chamber between said piston and said stator, passage means in said piston connecting said compression chamber and said transfer chamber, said passage means being adapted to be opened and closed by motion of said piston, passage means adapted to be opened and closed by motion of said piston connecting said transfer chamber with space between said rotor and said stator, said space serving as a combustion chamber.

2. A rotary engine comprising: a stator having a hollow interior, a rotor operatively supported in and enclosed by said stator, said rotor having a plurality of uniformly spaced peripheral cam segments, the crests of which rotatively engage a wall of said stator, an oscillator having a leading and a trailing arm mounted in said stator with said arms in engagement with said rotor, said leading arm serving as a cam follower and said trailing arm defining with said stator a fuel compression chamber, means defining a fuel inlet chamber in said stator, a piston attached to said trailing arm so as to reciprocate into and out of said fuel inlet chamber, passage means connecting said fuel inlet chamber and said compression chamber adapted to be opened and closed by motion of said piston, means defining a transfer chamber between said piston and said stator, passage means in said piston connecting said compression chamber and said transfer chamber, said passage means being adapted to be opened and closed by motion of said piston, passage means adapted to be opened and closed by motion of said piston connecting said transfer chamber with space between said rotor and said stator, said space serving as a combustion chamber.

References Cited in the file of this patent

UNITED STATES PATENTS

| | | |
|---|---|---|
| 920,678 | Smith | May 4, 1909 |
| 1,145,627 | Stradovsky | July 6, 1915 |
| 1,767,097 | Richardson | June 24, 1930 |
| 2,175,265 | Johnson | Oct. 10, 1939 |
| 2,500,458 | Hinckley | Mar. 14, 1950 |